United States Patent [19]

Dole et al.

[11] Patent Number: 4,810,679
[45] Date of Patent: Mar. 7, 1989

[54] RARE EARTH FLUORIDE ADDITIVE FOR SINTERING ALUMINUM NITRIDE

[75] Inventors: Stephen L. Dole, Burnt Hills; Ronald H. Arendt, Schenectady; Wayne D. Pasco, Scotia, all of N.Y.

[73] Assignee: General Electric Company, Schenectady, N.Y.

[21] Appl. No.: 159,486

[22] Filed: Feb. 22, 1988

Related U.S. Application Data

[63] Continuation of Ser. No. 887,504, Jul. 21, 1986, abandoned.

[51] Int. Cl.$^4$ .............................................. C04B 35/58
[52] U.S. Cl. ........................................ 501/98; 501/96; 501/151
[58] Field of Search ............................ 501/96, 98, 151

[56] References Cited

U.S. PATENT DOCUMENTS

| 2,480,473 | 8/1949 | Johnson | 501/98 |
| 3,238,018 | 3/1966 | Winter et al. | 501/98 |
| 3,503,787 | 3/1970 | Pendse | 148/6.35 X |
| 4,540,673 | 9/1985 | Takeda et al. | 501/96 |
| 4,547,471 | 10/1985 | Huseby et al. | 501/98 |
| 4,698,320 | 10/1987 | Kasori et al. | 501/96 |
| 4,711,861 | 12/1987 | Sawamura et al. | 501/98 |
| 4,719,187 | 1/1988 | Bardhan et al. | 501/97 |
| 4,746,637 | 5/1988 | Kasori et al. | 501/98 |

FOREIGN PATENT DOCUMENTS 166073  1/1986  European Pat. Off. ............. 501/96

Primary Examiner—William R. Dixon, Jr.
Assistant Examiner—Ann M. Knab
Attorney, Agent, or Firm—Jane M. Binkowski; James C. Davis, Jr.; James Magee, Jr.

[57] ABSTRACT

An aluminum nitride ceramic body with a thermal conductivity of at least 0.5 W/cm·K at 25° C. is produced by shaping a particulate mixture of aluminum nitride powder and an additive selected from the group consisting of $YF_3$, $ScF_3$, $LF_3$ where L is La, Ce, Pr, Nd, Sm, Gd, Dy, Ho and Er and a mixture thereof into a compact and liquid phase sintering the compact.

4 Claims, No Drawings

RARE EARTH FLUORIDE ADDITIVE FOR SINTERING ALUMINUM NITRIDE

This application is a continuation of application Ser. No. 887,504, filed July 21, 1986, abandoned.

The present invention relates to the use of a rare earth fluoride additive to produce a liquid phase sintered ceramic aluminum nitride body having a minimum thermal conductivity of 0.5 W/cm. at 25° C. and a porosity of less than 10%.

The thermal conductivity of an aluminum nitride single crystal is a strong function of dissolved oxygen and decreases with an increase in dissolved oxygen content. For example, the thermal conductivity of aluminum nitride single crystal having 0.8 wt % dissolved oxygen is about 0.8 W/cm·K whereas a suitably pure aluminum nitride single crystal, containing 300 ppm dissolved oxygen, has been measured to have a room temperature thermal conductivity of 2.8 W/cm·K.

Aluminum nitride powder has an affinity for oxygen, especially when its surface is not covered by an oxide. There are usually three different sources of oxygen in nominally pure AlN powder. Source #1 is discrete particles of $Al_2O_3$. Source #2 is an oxide coating, perhaps as $Al_2O_3$, coating the AlN powder particles. Source #3 is oxygen in solution in the AlN lattice. The amount of oxygen present in the AlN lattice in AlN powder will depend on the method of preparing the AlN powder. In the present invention, a rare earth fluoride is used to densify and deoxidize the aluminum nitride. According to the present invention, aluminum nitride powder can be processed in air and still will be sufficiently deoxidized in the sintering step to produce a ceramic body having a thermal conductivity of at least 0.5 W/cm·K at 25° C.

Briefly stated, the present process for producing a sintered polycrystalline aluminum nitride body having a porosity of less than about 10% by volume and a thermal conductivity of at least 0.5 W/cm·K at 25° C. comprises forming a mixture comprised of aluminum nitride powder containing oxygen and a fluoride additive, said additive being a member selected from the group consisting of $YF_3$ ranging from about 0.5% by weight to about 15% by weight, $ScF_3$ ranging from about 0.5% by weight to about 10% by weight, $LF_3$ where L is La, Ce, Pr, Nd, Sm, Gd, Dy, Ho and Er, ranging from about 1% by weight to about 20% by weight, and a mixture of said member ranging from greater than about 0.5% by weight to less than about 20% by weight, said % by weight of said additive being based on the amount of said aluminum nitride powder, shaping said mixture into a compact, and sintering said compact in a nitrogen-containing nonoxidizing atmosphere at a minimum temperature of at least about 1700° C. producing said polycrystalline body, said minimum sintering temperature being sufficient to product said sintered body.

In the present process, the aluminum nitride powder can be of commercial or technical grade. Specifically, it should not contain any impurities which would have a significantly deleterious effect on the desired properties of the resulting sintered product. The starting aluminum nitride powder used in the present process contains oxygen generally ranging in an amount up to about 4.4% by weight and usually ranging in amount from greater than about 1.0% by weight to less than about 4.0% by weight. Typically, commercially available aluminum nitride powder contains from about 1.5 weight % to about 3 weight % of oxygen and such powders are most preferred on the basis of their substantially lower cost.

Generally, the present starting aluminum nitride powder has a specific surface area which can range widely, and generally it ranges up to about 10 $m^2/g$. Frequently, it has a specific surface area greater than about 1.0 $m^2/g$, and more frequently of at least about 3.0 $m^2/g$, usually greater than about 3.2 $m^2/g$, and preferably at least about 3.4 $m^2/g$.

Generally, the present aluminum nitride powder in the present mixture, i.e. after the components have been mixed, usually by milling, has a specific surface area which can range widely, and generally it ranges to about 10 $m^2/g$. Frequently, it ranges from greater than about 1.0 $m^2/g$ to about 10 $m^2/g$, more frequently from about 3.2 $m^2/g$ to about 8.0 $m^2/g$, and still more frequently from about 3.4 $m^2/g$ to about 6.0 $m^2/g$, according to BET surface area measurement. Generally, for a given composition of a compact, the higher the surface area of the aluminum nitride, the lower is the sintering temperature required to produce a sintered body of a given porosity.

In the present process, processing of the aluminum nitride powder into a compact is carried out in air or at least partly carried out in air. During such processing, the aluminum nitride powder picks up oxygen from air and any such pick up of oxygen is controllable and reproducible or does not differ significantly if carried out under the same conditions. By processing of the aluminum nitride powder into a compact, it is meant herein to include all mixing of the aluminum nitride powder to produce the present mixture, all shaping of the resulting mixture to produce the compact, as well as handling and storing of the compact before it is deoxidized by the additive.

In the present processing of aluminum nitride, the oxygen it picks up can be in any form, i.e., it initially may be oxygen, or initially it may be in some other form, such as, for example, water. The total amount of oxygen picked up by aluminum nitride from air other media generally ranges from greater than about 0.03% by weight to less than about 3.00% by weight, and usually it ranges from about 0.10% by weight to about 1.00% by weight, and preferably from about 0.15% by weight to about 0.70% by weight, of the total weight of the aluminum nitride. Generally, the aluminum nitride in the present mixture and compact prior to sintering has an oxygen content ranging from greater than about 1.0% by weight or from greater than about 1.85% by weight to less than about 4.50% by weight, usually from about 2.00% by weight to about 4.00% by weight, and preferably it ranges from about 2.20% by weight to about 3.50% by weight, of the total weight of aluminum nitride.

The present fluoride additive is a rare earth metal fluoride. As used herein, the term rare earth metal fluoride includes yttrium fluoride, $YF_3$, and scandium fluoride, $ScF_3$, as well as the lanthanide fluorides, $LF_3$. Specifically, the present fluoride additive is selected from the group consisting of $YF_3$, $ScF_3$, $LF_3$ where L is La, Ce, Pr, Nd, Sm, Gd, Dy, Ho and Er, and a mixture thereof. $YF_3$ is useful in an amount ranging from about 0.5% by weight to about 15% by weight, preferably from about 5% by weight to about 12% by weight, and more preferably from about 9% by weight to about 12% by weight, based on the amount of aluminum nitride powder. $ScF_3$ is useful in an amount ranging from about 0.5% by weight to about 10% by weight, preferably from about 3% by weight to about 8% by weight, and more preferably from about 5% by weight to about 8% by weight, based on the amount of aluminum nitride powder. LF$_3$ is useful in an amount ranging from about 1% by weight to about 20% by weight, preferably from about 7% by weight to about 16% by weight, and more preferably from about 12% by weight to about 16% by weight, based on the amount of aluminum nitride powder. A mixture of any of the present fluoride additives is also useful in an amount ranging from greater than about 0.5% by weight to less than about 20% by weight based on the amount of aluminum nitride powder. Amounts of the present fluoride additive lower than the minimum given amount are not effective for producing the present sintered body. Amounts of the present fluoride additive higher than the maximum given amount provide no advantage and may lower the thermal conductivity of the sintered body due to the formation of too large a quantity of a second phase.

The particular amount of the present rare earth fluoride additive used is determinable empirically and depends on such factors as the oxygen content of the aluminum nitride powder, its specific surface area, sintering temperature and the desired density and thermal conductivity of the sintered body as well as the specific additive used.

In a given system, an increasing amount of oxygen in the aluminum nitride powder generally requires an increasing amount of the present fluoride additive to deoxidize the aluminum nitride powder sufficiently to produce the present sintered body.

Also, in a given system, generally as the specific surface area of the aluminum nitride powder is increased, the sinterability of the compact improves resulting in a sintered body of higher density. This should also enable the use of lower sintering temperatures.

In carrying out the present process, at least a substantially or significantly uniform mixture of the aluminum nitride powder and rare earth additive is formed and such mixture can be formed by a number of techniques. Preferably, the powders are ball milled in a liquid medium at ambient pressure and temperature to produce a uniform or significantly uniform dispersion. The milling media, which usually are in the form of cylinders or balls, should have no significant deleterious effect on the powders, and preferably, they are comprised of polycrystalline aluminum nitride. The liquid medium should have no significantly deleterious effect on the powders and preferably it is non-aqueous. Preferably, the liquid mixing or milling medium can be evaporated away completely at a temperature ranging from above room or ambient temperature to below 300° C. leaving the present mixture. Preferably, the liquid mixing medium is an organic liquid such as heptane or hexane. Also, preferably, the liquid milling medium contains a dispersant for the aluminum nitride powder thereby producing a uniform or significantly uniform mixture in a significantly shorter period of milling time. Such dispersant should be used in a dispersing amount and it should evaporate or decompose and evaporate away completely or leave no significant residue, i.e., no residue which has a significant deleterious effect in the present process, at an elevated temperature below 400° C. Generally, the amount of such dispersant ranges from about 0.1% by weight to less than about 3% by weight of the aluminum nitride powder, and generally it is an organic liquid, preferably oleic acid.

The liquid dispersion can be dried by a number of conventional techniques to remove or evaporate away the liquid and produce the present particulate mixture. If desired, drying can be carried out in air. Drying of a milled liquid dispersion in air causes the aluminum nitride to pick up oxygen and, when carried out under the same conditions, such oxygen pick up is reproducible or does not differ significantly. Also, if desired, the dispersion can be spray dried.

Generally, the fluoride additive in the present mixture has a specific surface area which can range widely. Generally, it is greater than about 0.4 m$^2$/g and frequently it ranges from greater than about 0.4 m$^2$/g to about 6.0 m$^2$/g, usually from about 1.0 m$^2$/g to about 5.0 m$^2$/g.

Shaping of the present mixture into a compact can be carried out by a number of techniques such as extrusion, injection molding, die pressing, isostatic pressing, slip casting, roll compaction or forming or tape casting to produce the compact of desired shape. Any lubricants, binders or similar shaping aid materials used to aid shaping of the mixture should have no significant deteriorating effect on the compact or the present resulting sintered body. Such shaping-aid materials are preferably of the type which evaporate away on heating at relatively low temperatures, preferably below 400° C., leaving no significant residue. Preferably, after removal of the shaping aid materials, the compact has a porosity of less than 60% and more preferably less than 50% to promote densification during sintering.

In a compact, an aluminum nitride containing oxygen in an amount of about 4.5% by weight or more generally is not desirable.

In the present sintering, the additive reacts with the oxygen of the aluminum nitride powder producing a fluoride gas which vaporizes away. Using YF$_3$ as an example, it is believed that the following deoxidation reaction occurs wherein the oxygen content of the aluminum nitride is given as Al$_2$O$_3$:

$$2YF_3 + Al_2O_3 \rightarrow Y_2O_3 + 2AlF_{3(g)} \qquad (1)$$
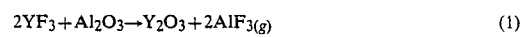

In the deoxidation effected by the present fluoride additive, aluminum fluoride is produced which is volatile at temperatures above 1300° C. and which vaporizes away in the present sintering step thereby removing the fluorine component.

The Y$_2$O$_3$ formed in situ combines with Al$_2$O$_3$ to produce a second polycrystalline phase or phases which may be as follows:

$$3Y_2O_3 + 5Al_2O_3 \rightarrow 2Y_3Al_5O_{12} \qquad (2)$$

or $$5Y_2O_3 + 6Al_2O_3 \rightarrow 2Y_3Al_5O_{12}Y_4Al_2O_9 \qquad (3)$$
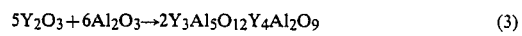

or $$3Y_2O_3 + Al_2O_3 \rightarrow Y_4Al_2O_9 + Y_2O_3 \qquad (4)$$
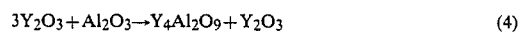

The specific amount of fluoride additive required to produce the present sintered body can be determined by a number of techniques. It can be determined empirically. Preferably, an initial approximate amount of additive is calculated from Equation (1), that is the stoichiometric amount for YF$_3$ set forth in Equation (1), and using such approximate amount, the specific amount of YF$_3$ required in the present process to produce the present sintered body would require one or a few runs to determine if too little YF$_3$ had been added, or to optimize the amount of YF$_3$. Specifically, this can be done by determining the porosity of the sintered body and its thermal conductivity.

The present compact is densified i.e., liquidphase sintered, at a temperature which is a sintering temperature for the composition of the compact to produce the present polycrystalline body having a porosity of less than about 10% by volume of the sintered body. Generally, the minimum sintering temperature is about 1800° C., but when GdF$_3$ is used as the additive, it is about 1700° C. It is possible that when one of the other lanthanide fluoride is used as the additive, the minimum sintering temperature may be lower than about 1800° C., and such minimum sintering temperature would be determinable empirically. In the present invention, for a compact having a given amount of the rare earth component, the minimum sintering temperature generally increases as the oxygen content of the aluminum nitride decreases. Minimum sintering temperature is dependent most strongly on composition and less strongly on particle size of the aluminum nitride and the green density of the compact, i.e., the porosity of the compact after removal of shaping aid materials. The present maximum sintering temperature is about 2050° C.

To carry out the present liquid phase sintering, the present compact should contain a sufficient amount of the rare earth component, i.e., Y, Sc or L, as well as a sufficient amount of oxygen contained in the aluminum nitride powder to form a sufficient amount of liquid phase at sintering temperature to densify the compact to produce the present sintered body. The present minimum densification, i.e., sintering, temperature depends mostly on the composition of the compact, i.e., the amount of liquid phase it generates. Specifically, for a sintering temperature to be operable in the present invention, it must generate at least sufficient liquid phase in the particular composition of the compact to carry out the present liquid phase sintering to produce the present product. A sintering temperature higher than about 2050° C. provides no significant advantage. Frequently, the present sintering temperature ranges from about 1800° C. to about 2000° C., preferably from about 1800° C. to about 1950° C., and more preferably from about 1850° C. to about 1950° C.

The compact is sintered, preferably at ambient pressure, in a gaseous nitrogen-containing nonoxidizing atmosphere which contains at least sufficient nitrogen to prevent significant weight loss of aluminum nitride. In accordance with the present invention, nitrogen is a necessary component of the sintering atmosphere to prevent any significant weight loss of AlN during sintering. Significant weight loss of the aluminum nitride can vary depending on its surface area to volume ratio, i.e., depending on the form of the body, for example, whether it is in the form of a thin or thick tape. As a result, generally, significant weight loss of aluminum nitride ranges from in excess of about 5% by weight to in excess of about 10% by weight of the aluminum nitride. Preferably, the nitrogen-containing atmosphere is nitrogen, or it is a mixture of at least about 25% by volume nitrogen and a gas selected from the group consisting of hydrogen, a noble gas such as argon and mixtures thereof. Also, preferably, the nitrogen-containing atmosphere is comprised of a mixture of nitrogen and hydrogen, especially a mixture containing up to about 5% by volume, preferably about 2% by volume, of hydrogen.

Sintering time is determinable empirically. Typically, sintering time ranges from about 40 minutes to about 90 minutes.

The polycrystalline aluminum nitride body produced by the present process is comprised of a polycrystalline aluminum nitride phase, i.e., the primary phase, and a second polycrystalline rare earth-containing phase. The composition of this second phase can vary depending largely on the composition of the compact, i.e., the unsintered body. Specifically, the second phase can be comprised of a rare earth aluminate phase or phases, a rare earth oxide phase or a mixture of these phases.

The amount of the polycrystalline second phase can vary depending largely on the amount of fluoride additive used and the oxygen content of the aluminum nitride.

When YF$_3$ is the additive, the sintered body will contain an yttrium-containing phase generally in an amount ranging from about 0.1% by volume to about 10% by volume, preferably from about 0.1% by volume to about 6% by volume, and more preferably from about 0.1% by volume to about 3% by volume of the sintered body. The yttrium-containing phase generally is $Y_3Al_5O_{12}$, $Y_4Al_2O_9$, $Y_2O_3$ or a mixture thereof.

When ScF$_3$ is the additive, the sintered body will contain a scandium-containing phase generally in an amount ranging from about 0.1% by volume to about 7% by volume, preferably from about 0.1% by volume to about 5% by volume, and more preferably from about 0.1% by volume to about 3% by volume of the sintered body.

When LF$_3$ is the additive, the sintered body will contain a lanthanide-containing phase generally in an amount ranging from about 0.1% by volume to about 6% by volume, preferably from about 0.1% by volume to about 4% by volume, and more preferably from about 0.1% by volume to about 3% by volume of the sintered body.

The present sintered polycrystalline body is a pressureless sintered ceramic body. By pressureless sintering herein it is meant the densification or consolidation of the compact without the application of mechanical pressure in the sintering step into a ceramic body having a porosity of less than about 10% by volume.

The polycrystalline body of the present invention is liquid-phase sintered, i.e., it sinters due to the presence of a liquid phase, that is liquid at the sintering temperature and is rich in the rare earth component and oxygen and contains some aluminum and possibly nitrogen. In the present polycrystalline body, the aluminum nitride grains have about the same dimensions in all directions, and are not elongated or disk shaped. Generally, the aluminum nitride in the present polycrystalline body has an average grain size ranging from about 1 micron to about 20 microns. An intergranular second phase of a rare earth aluminate is present along some of the aluminum nitride grain boundaries. The morphology of the microstructure of the present sintered body indicates that this intergranular second phase was a liquid at the sintering temperature.

The present sintered body has a porosity of less than about 10% by volume, preferably less than about 4% by volume, more preferably, less than about 2%, and most preferably less than about 1% by volume of the sintered body. Any pores in the sintered body are fine sized, and generally they are less than about 1 micron in diameter.

porosity can be determined by standard metallographic procedures and by standard density measurements.

The present process is a control process for producing sintered body of aluminum nitride having a thermal conductivity of at least 0.5 W/cm·K at 25° C. The thermal conductivity of the present polycrystalline body is less than that of a high purity single crystal of aluminum nitride which is about 2.8 W/cm·K at 25° C. If the same procedure and conditions are used throughout the present process, the resulting sintered body as a thermal conductivity and composition which is reproducible or does not differ significantly. Generally, thermal conductivity increases with a decrease in volume % of second phase, and for a given composition with increase in sintering temperature.

In the present process, aluminum nitride picks up oxygen in a controllable or substantially controllable manner. Specifically, if the same procedure and conditions are used in the present process, the amount of oxygen picked up by aluminum nitride is reproducible or does not differ significantly. Also, the present rare earth fluoride does not pick up oxygen, or does not pick up any significant amount of oxygen, from air or other media in the present process. More specifically, the present rare earth fluoride does not pick up any amount of oxygen in any form from the air or other media which would have any significant effect on the controllability or reproducibility of the present process. Any oxygen which the additive might pick up in the present process is so small as to have no effect or no significant effect on the thermal conductivity of composition of the resulting sintered body.

In the present invention, oxygen content may be determined by neutron activation analysis.

By ambient pressure herein, it is meant atmospheric or about atmospheric pressure.

By specific surface area or surface area of a powder herein, it is meant the specific surface are according to BET surface are measurement.

The present invention makes it possible to fabricate simple, complex and/or hollow shaped polycrystalline aluminum nitride ceramic articles directly. Specifically, the present sintered body can be produced in the form of a useful shaped article without machining or without any significant machining, such as a hollow shaped article for use as a container, a crucible, a thin walled tube, a long rod, a spherical body, a tape, substrate or carrier. It is useful as a sheath for temperature sensors. It is especially useful as a substrate for a semiconductor such as a silicon chip. The dimensions of the present sintered body differ from those of the unsintered body, by the extent of shrinkage, i.e., densification, which occurs during sintering.

The present ceramic body has a number of uses. In the form of a thin flat piece, i.e., in the form of a substrate or tape, it is especially useful as packaging for integrated circuits and as a substrate for an integrated circuit, particularly as a substrate for a semiconducting Si chip for use in computers.

The invention is further illustrated by the following examples wherein the procedure was as follows, unless otherwise stated:

The starting aluminum nitride powder contained oxygen in an amount of about 2% by weight and had a specific surface area of about 5 m$^2$/g.

The starting aluminum nitride powder was greater than 99% pure AlN exclusive of oxygen.

The rare earth fluoride additive, before any mixing, had a specific surface area of approximately 0.1 m$^2$/g or greater (powders generally −325 mesh or finer).

Non-aqueous heptane was used to carry out the mixing, i.e. milling, of the powders. In some of the examples, oleic acid, or dioctyl phthalate, or a commercially available dispersant comprised of polyoxypropylene and polyoxyethylene, was added to the heptane in an amount of about ½% by weight of the particulate mixture. The milling media was tungsten carbide in the approximate form of balls having a density of about 100%.

In Examples 1–3 the aluminum nitride powder alone, and in the remaining examples the aluminum nitride and rare earth fluoride powders, were immersed in the liquid milling medium in a plastic jar and vibratory milled in the closed jar at room temperature for the given period of time.

The milled liquid dispersion of the aluminum nitride powder or given powder mixture was dried at ambient pressure in air at ambient temperature or under a heat lamp under a cover of nitrogen.

In Example 2, after being milled for 7 hours, the aluminum nitride powder had a specific surface area of about 6 m$^2$/g, and in Example 3, after 16 hours of milling, its specific surface area was about 8 m$^2$/g.

The dried milled powder in Examples 1-3, or dried powder mixture in Examples 4–26, was die pressed typically at about 5 Kpsi in air at room temperature to produce a compact having a density of roughly 55% to 60% of its theoretical density.

Each compact was in the form of a disk of substantially uniform thickness ranging from about ¼ inch to about 1 inch. The disk had a diameter of about ⅝ inch or about ⅜ inch.

The furnace was a tungsten heater element furnace.

In all of the examples, the compacts were placed on a tungsten plate before firing.

All compacts were fired in an atmosphere of nitrogen and held at the given sintering temperature for 1 hour.

The firing atmosphere was at ambient pressure, i.e. atmospheric or about atmospheric pressure.

At the completion of firing, the samples were furnace-cooled to about room temperature.

All of the examples of Table I were carried out in substantially the same manner except as indicated in Table I and except as indicated herein.

Density of the sintered body was determined by the Archimedes method.

Porosity in % by volume of the sintered body was determined by knowing the theoretical density of the sintered body on the basis of its composition and comparing that to the density measured using the following equation:

$$\text{porosity} = \left(1 - \frac{\text{measured density}}{\text{theoretical density}}\right)100\% \qquad (5)$$

Phase composition of the sintered body was determined by optical microscopy and/or X-ray diffraction analysis.

Based on the predetermined oxygen content of the starting AlN powder and the measured compositions of some of the resulting sintered bodies, as well as other experiments, it was calculated or estimated that in every example in Table I, the aluminum nitride in the compact before sintering had an oxygen content of roughly about 0.3% by weight higher than that of the starting aluminum nitride powder.

The thermal conductivity of the sintered body of the examples, except Examples 9, 10, 13, 21, 22 and 24 was measured at 25° C. by a steady state heat-flow method using a rodshaped sample ~0.4 cm×0.4 cm×2.2 cm sectioned from the sintered body. This method was originally devised by A. Berget in 1888 and is described in an article by G. A. Slack in the "Encyclopedic Dictionary of Physics", Ed. by J. Thewlis, Pergamon, Oxford, 1961. In this technique the sample is placed inside a high-vacuum chamber, heat is supplied at one end by an electrical heater, and the temperatures are measured with fine-wire thermocouples. The sample is surrounded by a guard cylinder. The absolute accuracy is about ±3% and the repeatability is about ±1%. As a comparison, the thermal conductivity of an $Al_2O_3$ single crystal was measured with a similar apparatus to be 0.44 W/cm·K at about 22° C.

The thermal conductivity of the sintered body of Examples 9, 10, 13, 21, 22 and 24 was measured by laser flash at about 25° C.

The examples are illustrated in Table I.

Additive wt % in Table I shows the weight % of the given additive used in Examples 4-26 based on the amount of aluminum nitride powder. Examples 1-3 were control samples, i.e. only aluminum nitride powder was used to form the compact.

Heat-Up Time, hrs in Table I is the time it took to reach the given sintering temperature.

ties of the sintered bodies produced in Examples 5, 7, 8 and 12 would be at least 0.5 W/cm·K at 25° C.

From a comparison of Examples 19-26 and from other work, it is known that the thermal conductivity of the sintered bodies produced in Examples 19, 20, 23, 25 and 26 would be at least 0.5 W/cm·K at 25° C.

In copending U.S. patent application Ser. No. 880,516 entitled "Alkaline Earth Fluoride Additive For Sintering Aluminum Nitride" filed on June 30, 1986 in the names of Stephen Lee Dole et al., assigned to the assignee hereof and incorporated herein by reference, there is disclosed the production of an aluminum nitride ceramic body with a thermal conductivity of at least 0.5 W/cm·K at 25° C. by shaping a particulate mixture of aluminum nitride powder and an additive selected from the group consisting of $CaF_2$, $SrF_2$, $BaF_2$ and mixtures thereof into a compact and liquid phase sintering the compact.

What is claimed is:

1. A process for producing a sintered polycrystalline aluminum nitride body having a porosity of less than about 10% by volume and a thermal conductivity of at least 0.5 W/cm·K at 25° C. which consists essentially of forming a mixture consisting essentially of aluminum nitride powder containing oxygen ranging in amount from greater than about 1.0% by weight to less than about 4.0% by weight and $YF_3$, said $YF_3$ ranging from about 0.5% by weight to about 15% by weight based on the amount of said aluminum nitride powder, shaping said mixture into a compact, the aluminum nitride in said compact containing oxygen in an amount ranging

TABLE 1

| | | | | | Properties of Sintered Body | | | |
|---|---|---|---|---|---|---|---|---|
| Example | Additive wt % | Milling Time, hrs. | Heat-up Time/hrs | Sintering T, °C. | Sintered Density g/cm³ | Approximate Porosity vol % | Second Phases | Thermal Conductivity W/cm. K at 25° C. |
| 1 | None | 4 | 1 | 1850 | 2.64 | 19 | — | — |
| 2 | None | 7 | 1.5 | 1900 | 2.73 | 16 | — | — |
| 3 | None | 16 | 1 | 1975 | 3.10 | 5 | — | 0.4 |
| 4 | 0.5 $YF_3$ | 4 | 1 | 1700 | 2.84 | 13 | — | — |
| 5 | 0.5 $YF_3$ | 4 | 1.5 | 1800 | 3.26 | 0 | — | — |
| 6 | 1 $YF_3$ | 4 | 1.5 | 1700 | 2.49 | 24 | — | — |
| 7 | 1 $YF_3$ | 4 | 1.5 | 1800 | 3.26 | 0 | — | — |
| 8 | 1 $YF_3$ | 4 | 1 | 1850 | 3.26 | 0 | — | — |
| 9 | 1 $YF_3$ | 7 | 1.5 | 1900 | 3.23 | 1 | $Y_3Al_5O_{12}$ | 0.6 |
| 10 | 2 $YF_3$ | 7 | 3 | 1900 | 3.24 | 2 | — | 0.8 |
| 11 | 5 $YF_3$ | 4 | 1.5 | 1700 | 2.37 | 28 | — | — |
| 12 | 5 $YF_3$ | 4 | 3 | 1850 | 3.22 | 3 | $Y_4Al_2O_9$ and $Y_3Al_5O_{12}$ | — |
| 13 | 5 $YF_3$ | 7 | 3 | 1900 | 3.28 | 1 | — | 1.0 |
| 14 | 9 $YF_3$ | 4 | 3 | 1850 | 3.27 | 2 | — | 1.2 |
| 15 | 9 $YF_3$ | 7 | 3 | 1900 | 3.31 | 1 | — | 1.4 |
| 16 | 12 $YF_3$ | 7 | 4 | 1900 | 3.22 | 4 | — | 1.5 |
| 17 | 15 $YF_3$ | 4 | 2 | 1825 | 3.10 | 9 | $Y_4Al_2O_9$ and $Y_2O_3$ | 1.3 |
| 18 | 20 $YF_3$ | 4 | 5.5 | 1900 | 2.49 | 27 | — | — |
| 19 | 1 $GdF_3$ | 7 | 1 | 1700 | 3.24 | 1 | — | — |
| 20 | 1 $GdF_3$ | 7 | 1.5 | 1800 | 3.27 | 0 | $AlGdO_3$ | — |
| 21 | 1 $GdF_3$ | 7 | 1.5 | 1900 | 3.28 | 0 | — | 0.7 |
| 22 | 10 $GdF_3$ | 7 | 3 | 1900 | 3.23 | 5 | — | 1.2 |
| 23 | 15 $GdF_3$ | 7 | 3 | 1850 | 3.43 | 2 | $Gd_4Al_2O_9$ and $Gd_2O_3$ | — |
| 24 | 15 $GdF_3$ | 7 | 3 | 1900 | 3.37 | 3 | — | 1.2 |
| 25 | 20 $GdF_3$ | 7 | 2 | 1900 | 3.31 | 7 | $Gd_4Al_2O_9$ and $Gd_2O_3$ | — |
| 26 | 20 $ErF_3$ | 7 | 2 | 1900 | 3.37 | 6 | $Er_4Al_2O_3$ and $Er_2O_3$ | — |

Examples 5, 7-10, 12-17 and 19-26 illustrate the present invention.

From a comparison of Examples 5, 7-10 and 12-17 and other work, it is known that the thermal conductivifrom greater than about 1.0% by weight to less than about 4.5% by weight, and sintering said compact in a nitrogen-containing nonoxidizing atmosphere at a temperature ranging from about 1800° C. to about 2050° C. producing said polycrystalline body, said nitrogen-containing atmosphere containing sufficient nitrogen to prevent significant weight loss of said aluminum nitride.

2. The process according to claim 1 wherein said atmosphere is nitrogen.

3. The process according to claim 1 wherein said atmosphere is comprised of a mixture of nitrogen and hydrogen, and said hydrogen ranges up to about 5% by volume of said atmosphere.

4. The process according to claim 1 wherein said process is carried out at ambient pressure

* * * * *